United States Patent [19]

Nommensen

[11] 3,963,247

[45] June 15, 1976

[54] SHAFT SEAL

[75] Inventor: Johan P. Nommensen, Stein, Netherlands

[73] Assignee: Stamicarbon B.V., Geleen, Netherlands

[22] Filed: Feb. 19, 1975

[21] Appl. No.: 551,298

Related U.S. Application Data

[63] Continuation-in-part of Ser. No. 203,689, Dec. 1, 1971, abandoned.

[30]     Foreign Application Priority Data

Dec. 1, 1970   Netherlands....................... 7017502
Dec. 1, 1970   Netherlands....................... 7017503

[52] U.S. Cl.................................. 277/16; 277/59; 277/67; 277/73; 277/134
[51] Int. Cl.².......................................... F16J 15/40
[58] Field of Search ................ 277/16, 134, 67, 73, 277/135, 27, 59

[56]            References Cited
        UNITED STATES PATENTS

| | | | |
|---|---|---|---|
| 1,770,496 | 7/1930 | Lawaczeck | 277/67 X |
| 3,051,497 | 8/1962 | Wigg et al. | 277/16 X |
| 3,076,656 | 2/1963 | Hofmann | 277/16 |
| 3,558,238 | 1/1971 | Van Herpt | 277/134 X |
| 3,622,164 | 11/1971 | Herbert | 277/134 |
| 3,746,350 | 7/1973 | Mayer | 277/67 |

Primary Examiner—Samuel B. Rothberg
Attorney, Agent, or Firm—Cushman, Darby & Cushman

[57]               ABSTRACT

A visco-type seal is disclosed wherein a sealing pressure is built up in a fluid by means of one or more helical windings, the fluid being enclosed in a narrow clearance between a stator and a rotor. The alignment of the rotor within the stator is insured by providing a thin layer of material at the outer ends of at least one of the helical windings so that the clearance in a radial direction between the stator and the rotor at this location is less than the clearance existing in a radial direction between the helical windings and the stator. In one embodiment, the stator is designed as a sleeve which has a flexible connection in the radial direction with respect to a wall. The stator or a sealing element fastened thereto is movable in an axial direction by means of a resilient force to obtain a proper sealing when the device is at rest.

8 Claims, 6 Drawing Figures

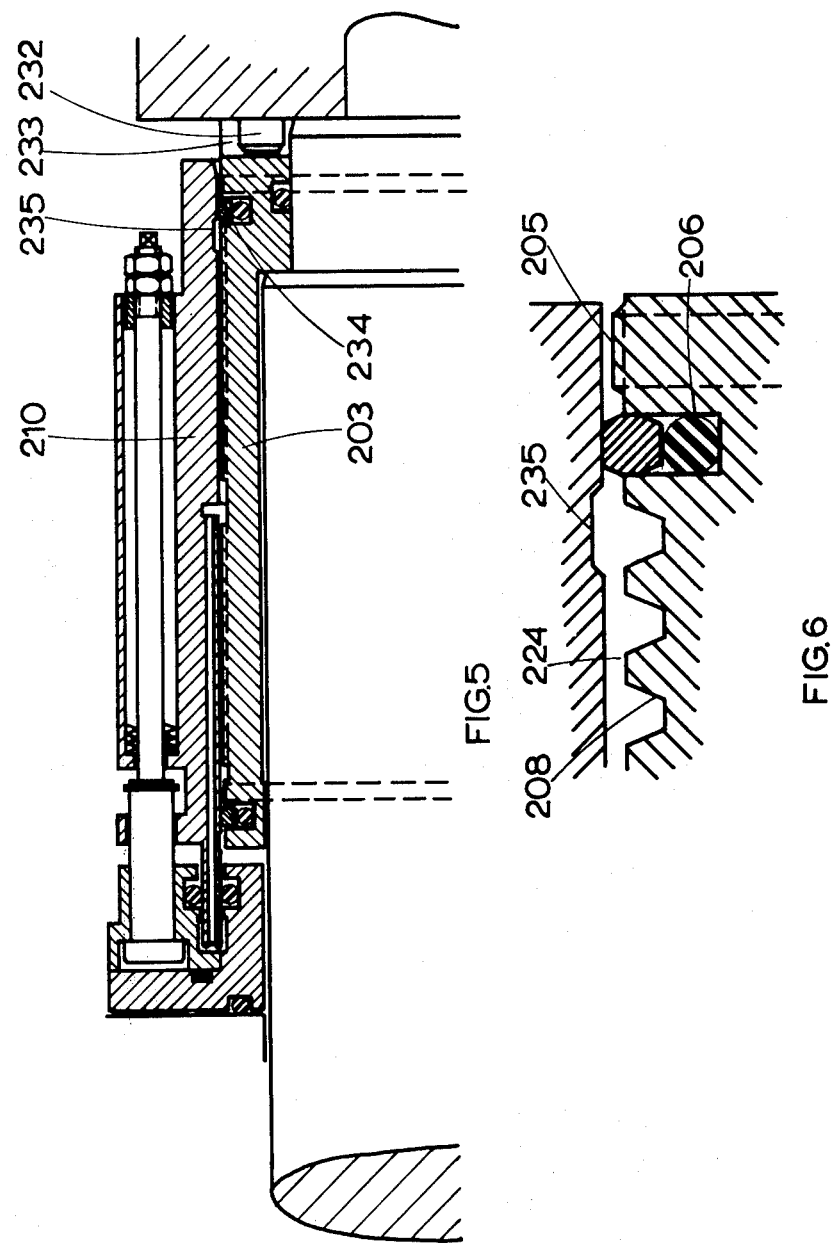

3,963,247

SHAFT SEAL

BACKGROUND OF THE INVENTION

The present application is a continuation-in-part application of Ser. No. 203,689 filed Dec. 1, 1971 now abandoned.

The present invention relates to a sealing arrangement for a rotatable shaft which projects through a wall wherein during rotation of the shaft a sealing pressure is built up in a fluid enclosed within a narrow annular clearance between the shaft and a stator by means of helical grooves rotating with the shaft whereby means are provided for maintaining a static seal when the shaft is at standstill.

The present invention particularly relates to the provision of a "floating stator" whereby alignment of the shaft and the stator is improved at high speeds of rotation. It has been established that at high speeds of rotation (for instance, at a speed in excess of 1,400 rpm) the sealing pressure obtained is no longer directly proportional to the speed of rotation, possibly due to eccentricity of the shaft.

Accordingly, it is an object of the present invention to provide a sealing arrangement in which alignment of the shaft with respect to the stator is improved during rotation.

A further object of the present invention is to maintain the required sealing pressure at high speeds of rotation.

Yet another object of the present invention is to substantially reduce the wear resulting on the helical grooves during rotation and thus to extend the operational life of the sealing arrangement.

The present invention further contemplates that the rotor be provided with two helical windings running in opposite directions wherein an annular, cental chamber is arranged inbetween the windings. The stator is provided with a bore ending in the central chamber, the bore being used to move the stator or an axially movable sealing element fastened to the stator, against resilient force, as a result of which proper sealing is also achieved when the device is at rest.

In case there exists a fluctuating pressure in the space to be sealed, for instance a stirred reactor, the stator may be provided with apertures to which a supply and a discharge line to and from a reservoir for sealing fluid are connected. The discharge line may comprise a control valve which is actuated depending on the pressure in the space to be sealed. The static sealing at standstill can then be taken care of by a set of axially slidable slip rings.

BRIEF DESCRIPTION OF THE DRAWINGS

Novel features of the improved sealing arrangement in accordance with the present invention will be more readily understood from a consideration of the following description taken together with the accompanying drawing, in which certain preferred adaptations are illustrated with the various parts thereof identified by suitable reference characters in each of the views, and in which:

FIG. 5 illustrates the embodiment of FIG. 2 when at standstill; and

FIG. 6 is an enlargement of the encircled area shown in FIG. 5.

DETAILED DESCRIPTION OF THE INVENTION

Figure 1:
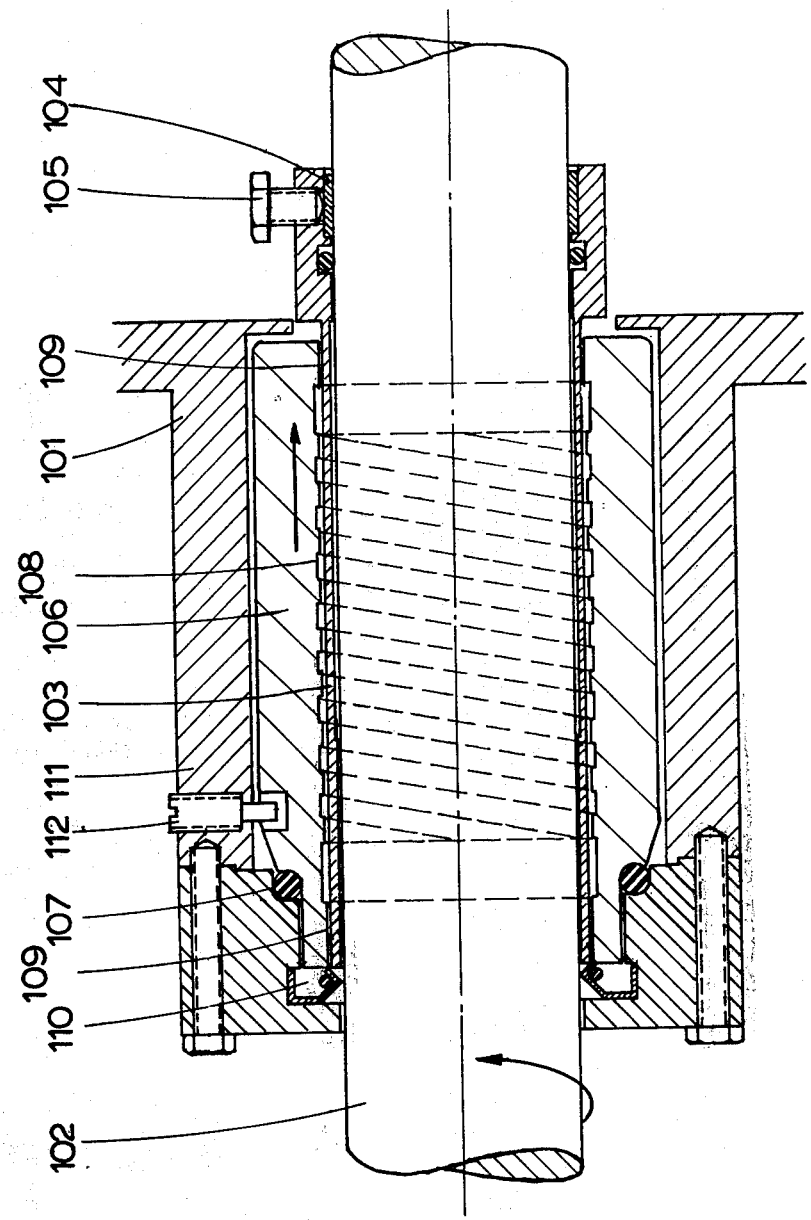
FIG. 1 illustrates a longitudinal section of a first embodiment of a shaft seal for the sealing of a liquid ring compressor for circulation of chlorene gas.

Referring now to FIG. 1, there is shown a driving shaft 102 carrying an impeller (not shown) projecting through the wall 101 of a liquid ring compressor which is not shown in detail. A cylindrical rotor sleeve 103 is secured around shaft 102 and secured thereto by means of a split ring 104 and a lock screw 105.

Closely fitting around rotor 103 is a stator sleeve 106 which is sealed from the wall by means of a single 0-ring 107 and in this way can move relative thereto. Stator 106 consists of suitable bearing material, such as bronze, white metal or carbon. In the surface of stator sleeve 106 which faces rotor 103, a single screw thread 108 is provided having a clearance of, for instance, 0.03 mm with sleeve 103. At the outer ends of screw threads 108 the stator sleeve is provided with a thin layer of material 109 which has a smaller clearance, for instance 0.01 mm with the shaft. A locking pin 112 projecting into a wide recess of the stator prevents the stator from rotating. The space between cover 111 and shaft 102 contains a retaining ring 110 or a similar seal. The clearance between the stator and the rotor is filled with fluid. The grooves of screw thread 108 are so placed that this fluid is pumped to the housing of the compressor (see arrow) when shaft 102 rotates.

Figure 2:
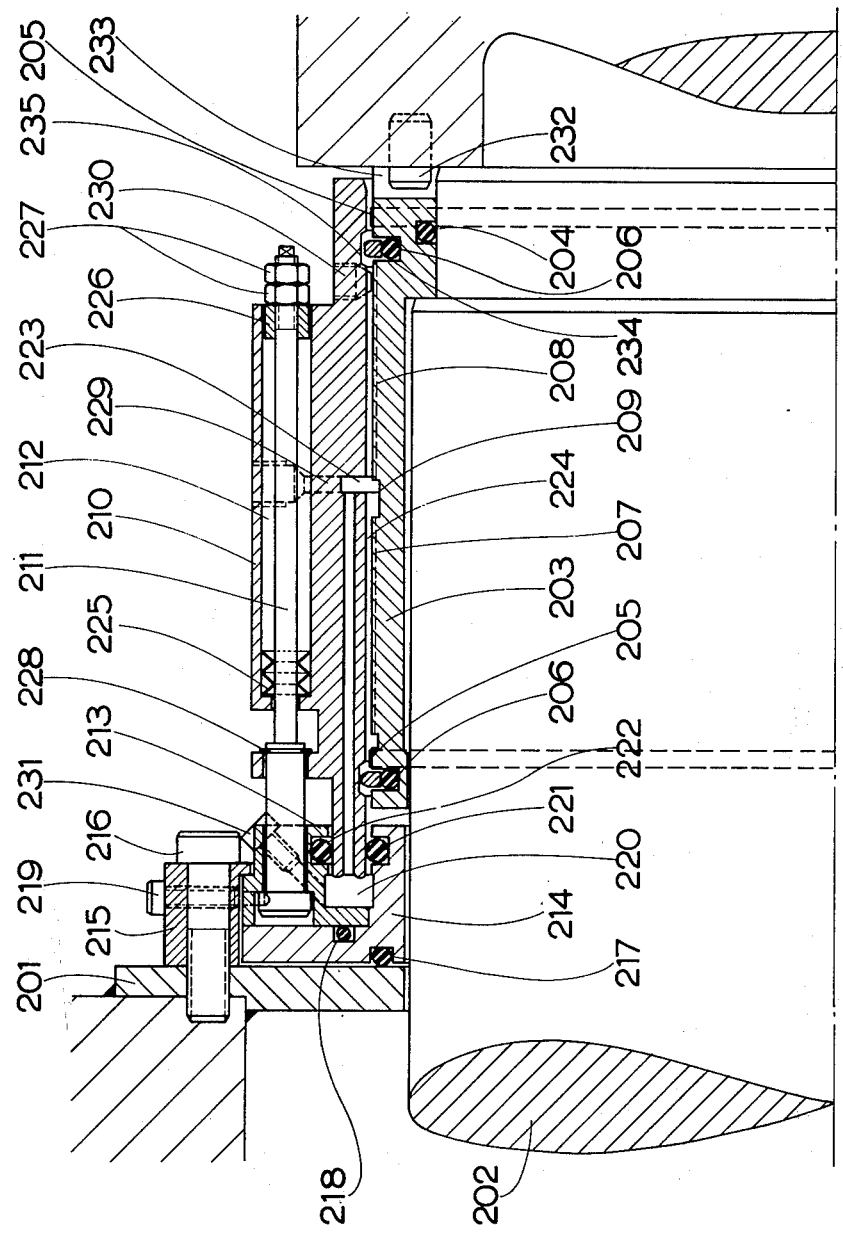
FIG. 2 illustrates part of a longitudinal section of the seal of the shaft of an extruder for a viscous product such as polyethylene solution in hexane.

In the FIG. 2 embodiment, there is shown a rotatable shaft 202 of an extruder which projects through a wall portion 201 of the extruder. On the shaft a sleeve 203 is arranged, which sleeve is provided at its outer circumference with two helical thread profiles 207 and 208 of identical pitch, profile 207 being left-handed and profile 208 being right-handed. Between both thread profiles there is an annular space 209.

A pin 232 protrudes into a slot 233 of the sleeve so that the sleeve rotates when the shaft rotates. An 0-sealing ring 204 is provided which forms a seal between shaft 202 and sleeve 203.

On the cylindrical outer surface of each end of the sleeve 203 there is provided a thin layer 205 of molybdenum formed by a spraying on and regrinding operation to provide a shoulder. Also provided at each end of shaft 202 is a groove 234 containing composite sealing ring 206 consisting of an outer ring of Teflon (a registered Trade Mark) and an inner rubber ring, which in the position shown in FIG. 2 cooperates with a recess in sliding sleeve 210.

Closely fitting to provide a minimum clearance of 0.06 mm round the threaded part of sleeve 203 is a stator member in the form of a sliding sleeve 210. Sliding sleeve 210 is adapted to slide in an axial direction over a plurality of rods 211 which pass through drilled channels 212 spaced around the circumference of sliding sleeve 210. The rods 211 are each provided with a head at one outer end and are fastened to the extruder wall 201 by means of a ring 213 which encloses the head and which rests on an L-shaped ring 214 and by means of a ring flange 215 which is fastened to wall 201 by a plurality of bolts 216 distributed around the circumference thereof. An 0-ring 217 is inserted between the wall 201 and the L-shaped ring 214, another O-ring 218 being mounted between the L-shaped ring 214 and ring 213. A locking screw 219 projecting through ring flange 215 prevents ring 213 from rotating. Between the rings 213 and 214 an annular space 220 is provided into which one of the outer ends of sliding sleeve 210 projects, which outer end is sealed on both sides from the rings 213 and 214 by two concentric flexible O-sealing 221 and 222, which constitute the flexible sealing members according to the invention.

The sliding sleeve 210 is internally cylindrical in configuration with the exception of locations having a slightly larger diameter, notably two places located opposite the two seal rings 206, and pressure chamber 223 located opposite space 209 between the two thread profiles and threaded sleeve 203. A plurality of longitudinal bores 224 are distributed across the circumference from the connection between pressure chamber 223 and annular space 220.

In each channel 212 a large number of disc springs 225 are placed around rod 211, the springs being retained by means of a ring 226 and a set of nuts 227, the latter being placed on the threaded end of rod 211. Ring 228 forms a stop to sliding sleeve 210 and rests in a groove provided for that purpose in the thicker section of rod 211.

Sliding sleeve 210 is provided at the circumference with a single radial channel 229, terminating in pressure chamber 223. A second channel 230 having a radial course is provided at the outer end of shaft 202 staggered away from the end in respect of seal ring 206. The two channels 229 and 230 are staggered in respect to the channels 212 and the longitudinal bores 224. Channel 230 is used for the supply of a sealing fluid and lubricant, for example silicone oil, from a source not shown, while channel 229 is used for discharge thereof, possibly through a non-return valve (not shown). Space 220 and longitudinal bores 224 may be filled with lubricant prior to operation. A vent screw 231 is provided.

The seal operates as follows. When shaft 202 starts to rotate, lubricant is pumped through the helixes 207 and 208 on the threaded sleeve to space 209, so that pressure builds up in the space. The lubricant is transmitted through pressure chamber 223 and longitudinal bores 224 to space 220, as a result of which an axial (longitudinal) pressure is exerted on sliding sleeve 210 which will then move to the right against the action of disc springs 225 until the stop of ring 228 is reached (i.e., the position shown in FIG. 2). If the shaft continues to rotate, lubricant is continuously supplied through channel 230 and excess lubricant discharged through channel 229. When shaft 202 stops the pressure in pressure chamber 223 decreases and sliding sleeve 210 will be urged by the disc springs 225 in the direction of the wall portion 201 of the extruder. As a result, the composite rings 206 in threaded sleeve 203 provide a seal to prevent leakage of lubricant during the standstill period of the shaft. When the shaft is stationary the sleeve 210 is axially urged by spring 225, the ring 206 co-operating with the inner surface of the sleeve to provide a seal as shown in FIG. 5. The assemblage of disc springs 225 may be set for the proper sealing pressure by means of the nuts 227. In the axial direction the space 209 on threaded sleeve 203 is at least as long as the stroke of sliding sleeve 210. As shown in FIG. 6 the clearance at the place of the shoulders 205 between sliding sleeve 210 and sleeve 203 is smaller than at the place of the threads 207 and 208 so the threads are prevented from contacting the inner surface of the sliding sleeve 210 by the layers of material 205 sprayed on the outer ends of sleeve 203. Consequently the thread profiles 207 and 208 are not subjected to sliding contact and wear so that the pumping action is not influenced by wear of the cooperating parts. The clearance at the place of shoulders 205 may be for instance 0.01 mm. The flexible sealing members 221 and 222 enable the sliding sleeve 210 to follow lateral movements of sleeve 203 which may result due to vibrations or misalignment of shaft 202. Consequently sliding sleeve 210 and sleeve 203 remain in perfect alignment under all operating conditions defined by shoulder 205. The result is a constant pumping action of the threads 207 and 208.

Figure 3:
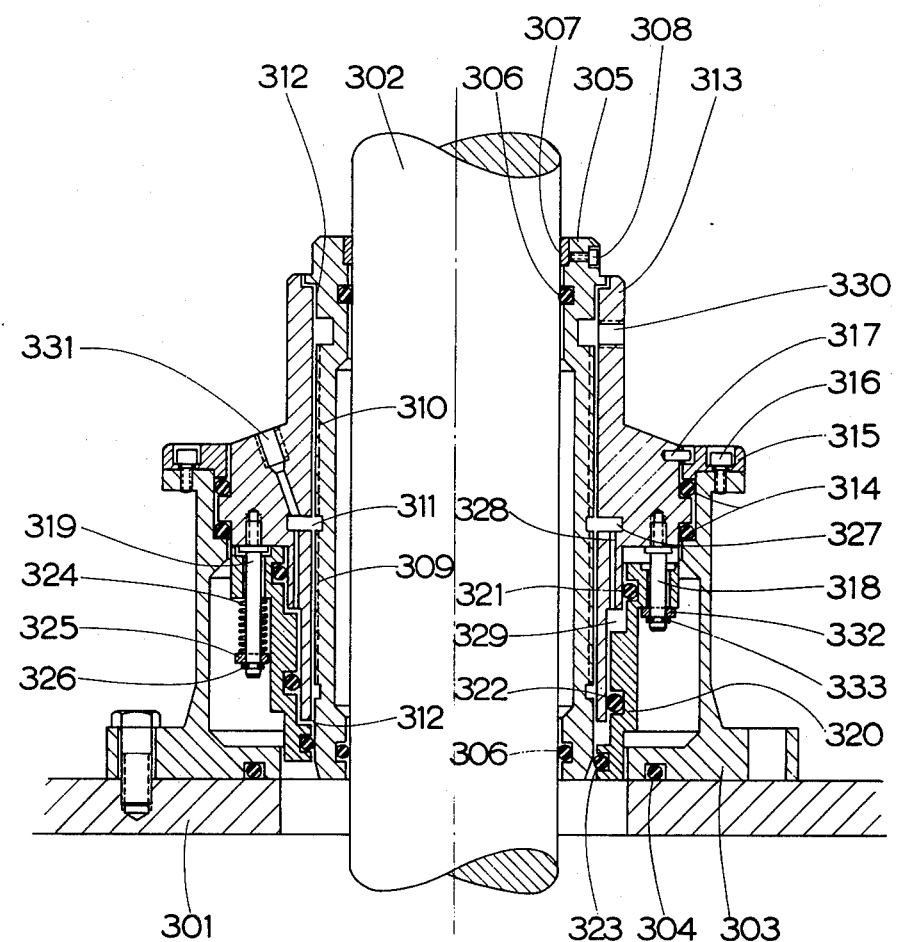
FIG. 3 illustrates a seal of an agitator shaft.

FIG. 3 shows a seal, against hydrogen gas, of an agitator shaft in a hydrogenation vessel for caprolactam, which vessel contains hydrogen ($H_2$) having a pressure of about 6 ats g. and a temperature of about 90°C. In the left-hand part of the FIGURE the seal is shown in closed position and in the right-hand in opened position.

A driving shaft 302 of an agitator projects through the wall 301 of a hydrogenation vessel, neither the agitator nor the hydrogenation vessel being shown in more detail. The parts are mutually sealed in the following way: a flange 303 is screwed into wall 301, an O-ring 304 taking care of the sealing between them. Round the shaft 302 a threaded sleeve 305 is placed which, near the outer ends, is sealed from the shaft by O-rings 306 and which is fastened to shaft 302 by means of a lock screw 308 acting on a clamping ring 307. At its outer circumference, threaded sleeve 305 has two screw thread profiles, 309 and 310, of equal pitch, the one (309) being right-handed and the other (310) left-handed. Between the two helixes there is an annular space 311 having a smaller internal diameter. Near the two outer ends 312 of threaded sleeve 305 the diameter is slightly larger (approximately 0.024±0.005 mm) than the diameter of the screw thread profiles 309 and 310. On the outer side, the lower end of threaded sleeve 305 is bevelled to some degree.

A sleeve 313, having a close fit (clearance 0.03mm) round threaded sleeve 305 and acting in unison therewith, is installed in flange 303, which sleeve is sealed from flange 303 with the aid of a set of flexible O-rings 314, and which is fastened to flange 303 by means of hold-down ring 315 and bolt 316. One or more locking pins 317 prevent sleeve 313 from being turned as a result of the rotation of shaft 302. A set of short pins 318 and a set of long pins 319 are alternately screwed into sleeve 313. These pins carry and guide a sliding sleeve 320 which is sealed from sleeve 313 by the O-rings 321 and 322, and from threaded sleeve 305 by O-ring 323. In its position of rest, sliding sleeve 320 is forced against sleeve 313 by a set of pressure springs 324 placed around the long pins 319, which springs are retained by the rings 325 and by the locking rings 326. In this position (left-hand side of FIG. 3), the slit between sliding sleeve 320 and threaded sleeve 305 is sealed by O-ring 323, so that leakage of the $H_2$ gas out of the vessel and leakage of the sealing fluid into the vessel is impossible. The sealing is effected by the springs 324 and by the gas pressure in the hydrogenation vessel.

At the level of space 311 on threaded sleeve 305, sleeve 313 is provided with an annular pressure chamber 327, from which chamber a number of longitudinal bores 328 run to space 329 between sleeve 313 and sliding sleeve 320 (and between the two O-rings 321 and 322). Near the upper end, sleeve 313 is provided with a feed channel 330 that can be closed, as well as with a feed channel 331 which can also be closed, the latter channel connecting with pressure chamber 327 and being used for prior filling of the space between sleeve 313 and threaded sleeve 305 with a sealing fluid which is at the same time a lubricant, such as silicone oil MS 200.

When shaft 302 starts to rotate (clockwise), sealing fluid is pumped through the two thread profiles 309 and 310 to the spaces 311 and 327, causing a high pressure to build up in these chambers (about 32 ats g. at 250 r.p.m.). This pressure is hydraulically transmitted, via the longitudinal bores 328, to space 329 and exerts a downward force on sliding sleeve 320. As a result of this, sliding sleeve 320 moves downwards, against the action of the springs 324, until it reaches the stops, formed by the rings 332 and 333 on the short pins 318. This situation is illustrated in the right-hand part of the figure.

Figure 4:
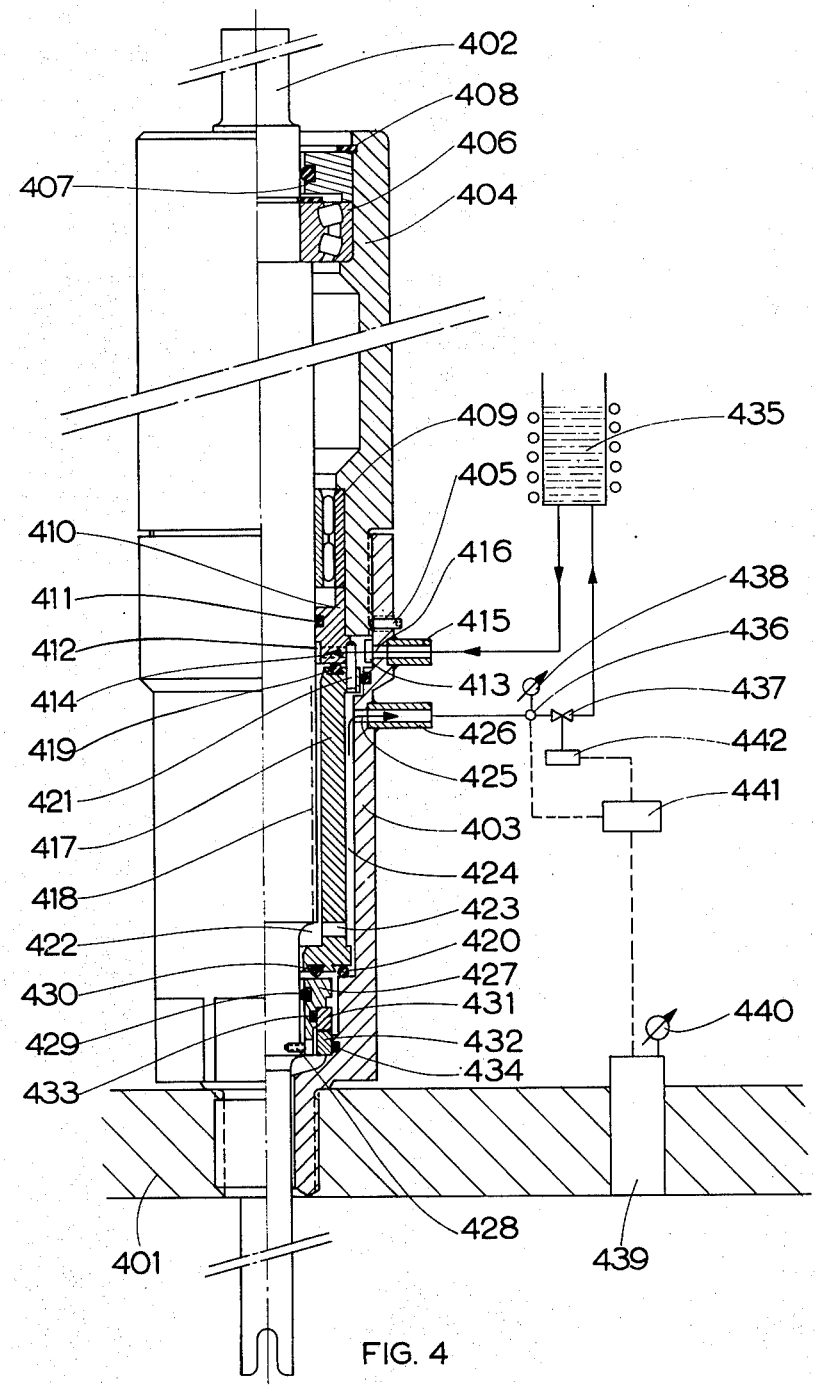
FIG. 4 shows another embodiment of the seal of an agitator shaft, partially in elevation and partially in cross-section.

FIG. 4 shows the seal of a shaft for the agitator of a pressurized reactor which is completely filled with liquid and which is used for polymerization of ethylene in solution.

The wall 401 of a reactor vessel not shown in more detail is passed through by a driving shaft 402 for an agitator (not shown in the drawing) located deeply in the reactor. Into wall 401 a sleeve-shaped connecting piece or housing 403 is screwed which, at the level of wall 401, closely fits round shaft 402 without touching it and which, in upward direction, widens stepwise. Into the widest part of housing 403 a bearing bush 404 is screwed, and these parts are secured by means of a lock screw 405. At the upper side, shaft 402 is supported in a double-row barrel bearing 406, whose outer race is confined in bearing bush 404 with the aid of a locking piece 407 and a locking washer 408, the latter fitting a groove provided for this purpose in bush 404. Shaft 403 is further supported in a double-row needle bearing 409, the outer race of which is confined between a shoulder of bearing bush 404 and a spacer 410 which is clamped between a shoulder of housing 403 and the lower end of bush 404. An O-ring 411 takes care of the seal between shaft 402 and spacer 410.

At the level of the clamping, spacer 410 is provided on both the inner- and outer-circumference with circular recesses, 412 and 413, which are connected by means of one or more radial bores 414. A feed pipe 415 is installed on housing 403, which feed pipe communicates with the outermost space 413 via a bore 416 through the wall of housing 403.

In the space between shaft 402 and housing 403 there is a sleeve 417 round the shaft, the clearance with shaft 402 being substantially smaller than that with housing 403. At the level of the internally smooth sleeve 417, shaft 402 is provided with a continuous screw thread 418 over part of its outer circumference. Alternatively, in case of a smooth shaft surface, the screw thread may be provided on the inside of sleeve 417. Sleeve 417 is sealed from spacer 410 by an O-ring 419, and from housing 403 by O-ring 420, while being clamped between these two parts 403 and 410. One or more locking pins 421 prevent sleeve 417 from being rotated relative to spacer 410.

Between shaft 402 and the lower end of sleeve 417 there is an annular space 422 which communicates, via a bore 423 in sleeve 417, with space 424 between sleeve 417 and housing 403. Near the upper end of space 424, housing 403 is provided with a bore 425, to which a discharge-pipe 426 connects.

In the bottom part of housing 403 there is a sliding ring holder 427 round shaft 402, which holder, by means of lock screw 428, is engaged when the shaft rotates, but which can move axially over the shaft. An O-ring 429 seals the holder from shaft 402. In the lower face of sleeve 417, concentrically with O-ring 420, there is a second O-ring 430 to seal against sliding ring holder 427. Between sliding ring holder 427 and connecting piece 403 two hard metal sliding rings 431 and 432 are placed, one on top of the other.

One O-ring 433 forms the seal between ring 431 and holder 427, another O-ring, 434, forming the seal between ring 432 and housing 403.

A vessel 435 for the sealing fluid, for instance silicone oil, which vessel can be heated if necessary, is connected to the feed, 415. The sealing fluid fills all spaces between shaft 402 and housing 403. The discharge 426 in turn is connected to vessel 435 via a pressure gauge 436 and a control valve 437. If desired, the outlet pressure $P_1$ of the visco seal 402, 417, 418, can be read on meter 438.

In reactor wall 401 a pressure gauge 439 is installed, which is shown schematically, it being possible for the measured pressure P in the reactor to be read on a pressure meter 440. The pressures measured by the gauges 436 and 439 are compared in control device 441. The output signal of control device 441 is set for a constant pressure difference.

The shaft seal operates as follows: Rotation of the shaft 402 at a rate of, for instance, 900 revolutions per minute causes a sealing fluid pressure to be built up in the visco seal 402, 417, 418, which, if control valve 407 is in closed position, may increase to an excess pressure of 120 atmospheres, and, if control valve 437 is fully opened (so that the counter-pressure for the visco seal is practically zero), suffices to circulate about 4 liters per hour according to the arrows shown in the drawing. By setting the differential pressure between the visco seal and the reactor to, for instance, 1 kg/cm$^2$ on control device 441, the amount of sealing fluid to be circulated by the visco seal is so regulated by the control device, using control valve 437, that the pressure of the visco seal is invariably 1 kg/cm$^2$ higher than the reactor pressure.

The pressure difference over the slip ring seal formed by the two sliding rings 431 and 432 amounts to 1 kg/cm$^2$, as a result of which leakage of sealing fluid to the reactor is practically zero. At a reactor pressure of 60 atmospheres and a visco seal pressure of 61 atmospheres 2 liters of sealing fluid per hour are circulated via storage vessel 435.

When pressure P in the reactor decreases, also the pressure in the visco seal decreases because control valve 437 is opened further by servo mechanism 442. When the reactor pressure rises, also the pressure in the visco seal rises because servo mechanism 442 reduces the passage of control valve 437.

When the shaft 402 is going to stop the pressure in the visco seal falls off, while the reactor pressure forces the floating sliding-ring holder 427 and the sliding ring 432 upwards along shaft 402, sealing being then provided by O-ring 430.

The reactor liquid (polyethylene solution) does not penetrate beyond the O-rings 420 and 430.

When the agitator is started again, the visco seal presses ring 427 down, so that the hard metal sliding rings 431 and 432 again turn on top of each other, with an extremely small leakage to the reactor.

For disassembly, after lock screw 405 has been undone, bearing housing 404 can be unscrewed from housing 403, whereupon the entire visco seal can be removed. Because of the high temperature (180°C) allowance has been made for thermal expansion of the materials, while sleeve 417, sealed by the O-rings 419, 420 and 430 is relatively free to move in radial direction and, hence, capable of optimum adjustment.

What is claimed is:

1. A sealing arrangement for a rotatable shaft which projects through a wall comprising:
    a sleeve mounted on said shaft for rotation therewith;
    a stator member arranged concentrically about said sleeve, fixed to prevent rotation thereof and guided for limited axial movement relative to said sleeve;
    said sleeve having helical windings on the outer surface thereof in spaced relationship from the stator member such that will produce a hydraulic pressure between said sleeve and said stator member sufficient to produce axial movement of said stator member by action of said fluid on a surface of said stator member presenting an area perpendicular to said shaft, when said sleeve is rotated;
    a thin layer of material sprayed on said sleeve at the ends of the windings so as to reduce the spaced relationship at said ends for aligning said sleeve within said stator member; and
    static seal means interposed between said stator member and said sleeve for sealingly engaging said stator member and said sleeve when said sleeve is at rest;
    spring means biasing said stator member in an axial direction opposite from the direction of movement of said stator memmber in response to said hydraulic pressure of said fluid, whereby said static seal means sealingly engages said stator member and said sleeve when said sleeve is at rest.

2. A sealing arrangement as described in claim 1 wherein said thin layer of material comprises molybdenum.

3. A sealing arrangement as described in claim 1 wherein said sleeve is provided with a pair of helical windings each running in opposite directions, an annular central chamber being disposed between the pair of windings, said stator being provided with a bore ending in said central chamber, the bore providing a passageway for fluid pumped from said central chamber during rotation of said shaft to an annular space at the end of the bore, fluid pressure thereby being built up and used to move the stator in an axial direction.

4. A sealing arrangement as described in claim 3 wherein said thin layer of material comprises molybdenum.

5. A sealing arrangement for a rotatable shaft which projects through a wall comprising:
    a housing member;
    a sleeve mounted on said shaft for rotation therewith;
    a stator member arranged concentrically to said sleeve, fixed to said housing member to prevent rotation of the stator member and guided in said housing member for limited axial movement relative to said sleeve;
    said stator member having helical windings on the inner surface thereof in spaced relationship from the sleeve such that will produce a hydraulic pressure between said sleeve and said stator member sufficient to produce axial movement of said stator member by action of said fluid on a surface of said stator member presenting an area perpendicular to said shaft, when said sleeve is rotated;
    a thin layer of material sprayed on said stator member at the ends of the windings so as to reduce the spaced relationship at said ends for aligning said sleeve within said stator member; and
    static seal means interposed between said stator member and said housing member for sealingly engaging said stator member and said housing member when said sleeve is at rest;
    spring means biasing said stator member in an axial direction opposite from the direction of movement of said stator member in response to said hydraulic pressure of said fluid, whereby said static seal means sealingly engages said stator member and said housing member when said sleeve is at rest.

6. A sealing arrangement as described in claim 5 wherein said thin layer of material comprises molybdenum.

7. A sealing arrangement for a rotatable shaft which projects through a wall comprising:
    a housing member;
    a shaft rotatably supported by said housing member;
    a stator member arranged concentrically about said shaft, fixed to said housing member to prevent rotation of said stator member and guided in said housing member for limited axial movement relative to said shaft;
    said shaft having helical windings on the outer surface thereof in spaced relationship from the stator member such that will produce a hydraulic pressure between said shaft and said stator member sufficient to produce axial movement of said stator member by action of said fluid on a surface of said stator member presenting an area perpendicular to said shaft, when said shaft is rotated;
    a thin layer of material sprayed on said shaft at the ends of the windings so as to reduce the spaced relationship at said ends for aligning said shaft within said stator member; and
    static seal means interposed between said stator member and said housing member for sealingly engaging said stator member and said housing member when said shaft is at rest;
    spring means biasing said stator member in an axial direction opposite from the direction of movement of said stator member in response to said hydraulic pressure of said fluid, whereby said static seal means sealingly engages said stator member and said housing member when said shaft is at rest.

8. A sealing arrangement as described in claim 7 wherein said thin layer of material comprises molybdenum.

* * * * *